Nov. 29, 1966 R. MONAGHAN 3,288,996
COMPOUND SCINTILLATION DETECTOR FOR SIMULTANEOUS DETECTION
OF THERMAL AND EPITHERMAL NEUTRONS
Filed June 13, 1963 3 Sheets-Sheet 1

FIG. I

INVENTOR.
RALPH MONAGHAN
BY
*Russell E. Schloss*
ATTORNEY

INVENTOR.
RALPH MONAGHAN

INVENTOR.
RALPH MONAGHAN though, it is desirable to perform these two logs simulta-
United States Patent Office 3,288,996
Patented Nov. 29, 1966

3,288,996
COMPOUND SCINTILLATION DETECTOR FOR SIMULTANEOUS DETECTION OF THERMAL AND EPITHERMAL NEUTRONS
Ralph Monaghan, Needham Heights, Mass., assignor, by mesne assignments, to Dresser Industries, Inc., Dallas, Tex., a corporation of Delaware
Filed June 13, 1963, Ser. No. 287,643
9 Claims. (Cl. 250—71.5)

This invention relates to radioactivity well logging and is particularly directed to novel means for simultaneously detecting thermal and epithermal neutrons with a single photomultiplier tube.

In the art of radioactivity well logging, much information concerning the formations surrounding the borehole can be obtained by bombarding the formations with high energy neutrons and detecting and analyzing those neutrons which have been scattered in the formations and returned to the borehole. Thus, for example, it has been found that when thermal neutrons are detected the log thus produced is affected by the amount of chlorine contained in the formations or in the interstitial fluids while the log produced when epithermal neutrons are detected is substantially unaffected by chlorine but is influenced by the amount of hydrogen present. Since all fluids encountered in earth formations contain relatively high proportions of hydrogen, the epithermal neutron log provides an indication of whether a formation is porous or non-porous. At the same time, water found in subsurface formations frequently contains chlorine whereas oil and gas do not. Therefore, the thermal neutron measurement serves to distinguish salt water from oil or gas.

This combination of logs has been found to be of considerable value and numerous types of apparatus have been proposed heretofore for obtaining such logs. It is obviously desirable to perform these two logs simultaneously since this facilitates correlation of the logs for interpretation and greatly reduces the down time on the well required to perform the two logs. Unfortunately, detectors which are sensitive to thermal neutrons are also sensitive to epithermal neutrons and vice versa. Consequently, considerable difficulty has been encountered in attempting to provide apparatus for performing these two logs simultaneously. The general practice heretofore has been to provide separate detectors and to shield one of the detectors to prevent thermal neutrons from being detected thereby while allowing thermal neutrons to be detected by the other detector. However, this requirement for two separate detectors substantially increases the length and complexity of the tool. Moreover, the two detectors are usually mounted at different sources to detector spacings and, consequently, are exposed to different conditions so that interpretation of the logs is more difficult. In addition, the different detectors may be affected differently by borehole temperature, age and other factors. Thus, none of the prior art systems have been entirely satisfactory.

These disadvantages of the prior art are overcome with the present invention and novel apparatus is provided which permits thermal and epithermal neutron logs to be made simultaneously at the same source to detector spacing and with a single photomultiplier tube. In this way, the length and complexity of the subsurface instrument may be greatly reduced and any variation in the detector response will be identical for both logs. Moreover, the source to detector spacing will be identical for both logs. Thus, interpretation and comparison of the two logs is greatly simplified.

The advantages of the present invention are preferably attained by providing a compound scintillation detector comprising two neutron-sensitive scintillation phosphors separated by a shield of neutron absorptive material. The two phosphors are optically coupled to a common photomultiplier tube and are arranged so that incident neutrons must pass through one of the phosphors and through the shield in order to be detected by the second phosphor. By forming the first phosphor relatively thin, epithermal neutrons will pass through the first phosphor and the shield without being detected but will be detected by the second phosphor. On the other hand, because of their lesser penetrating power, thermal neutrons will be detected by the first phosphor and any which pass through the first phosphor will be prevented from reaching the second phosphor by the shield. In addition, light attenuation means is provided to reduce the intensity of light passing from one of the phosphors to the photomultiplier tube. This reduction in the intensity of the scintillations from one phosphor produces a difference in the relative amplitude of the pulses at the output of the photomultiplier tube and permits ready discrimination of the signals from the respective phosphors. Since only one photomultiplier tube is required and since signal discrimination is electronically a simple process, it will be seen that the present invention permits a substantial reduction in the size and complexity of the subsurface instrument. Moreover, it will be seen that the arrangement of the present invention permits the two logs to be performed simultaneously at a common source to detector spacing.

Accordingly, it is an object of the present invention to provide novel means for simultaneous thermal and epithermal neutron logging.

Another object of the present invention is to provide novel means for simultaneous thermal and epithermal neutron logging employing a single photomultiplier tube for performing both logs.

A further object of the present invention is to provide novel means for simultaneous thermal and epithermal neutron logging whereby the two logs may be performed with the same source to detector spacing.

A specific object of the present invention is to provide novel means for simultaneous thermal and epithermal neutron logging including a compound scintillation detector comprising a pair of neutron-sensitive scintillation phosphors separated by a neutron absorptive shield and optically coupled to a common photomultiplier tube, said phosphors being so positioned that incident neutrons from the formations must pass through the first of said phosphors and through said shield in order to be detected by the second of said phosphors, together with light attenuating means for reducing the intensity of light passing from one of said phosphors to said photomultiplier tube.

These and other objects and features of the present invention will be apparent from the following detailed description taken with reference to the figures of the accompanying drawings.

Figure 1:
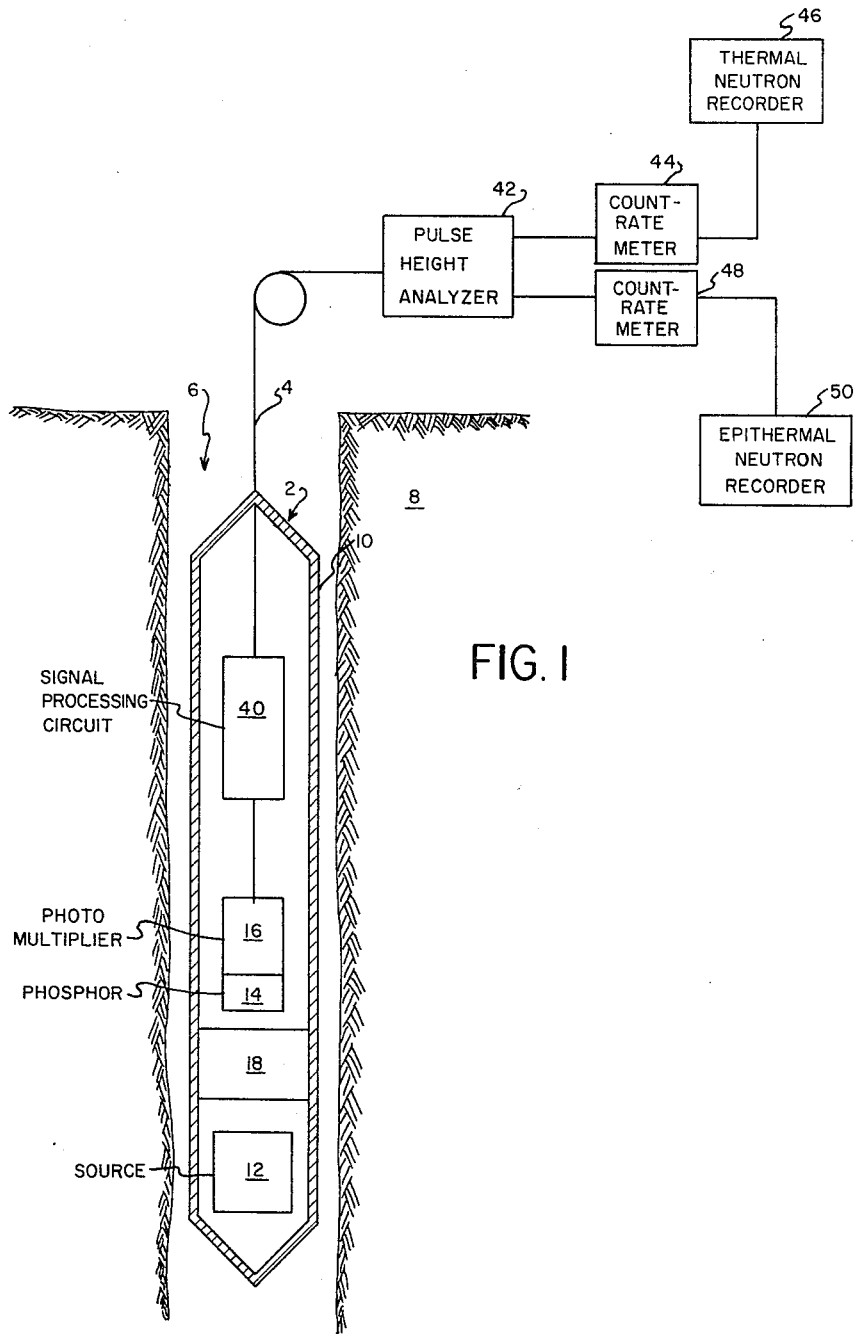
FIGURE 1 is a diagrammatic representation of apparatus for simultaneous thermal and epithermal neutron logging embodying the present invention.

In the form of the present invention chosen for purposes of illustration, FIG. 1 shows a subsurface well logging instrument 2 suspended by means of a cable 4 in a borehole 6 which penetrates the earth 8. The cable 4 serves to support the instrument 2 and provides electrical connections between the subsurface instrument 2 and the equipment at the surface of the earth. The subsurface instrument 2 is formed of a suitable pressure resistant housing 10 having a high energy neutron source 12 mounted adjacent the lower end thereof. The neutron source 12 may be a "natural" source, such as a radium-beryllium source, or an "artificial" source, such as a particle accelerator employing the deuterium-tritium reaction. A scintillation detector including a compound phosphor 14 and a photomultiplier tube 16 is mounted within the housng 10 at a predetermined distance from the source 12; and shielding 18 formed of a neutron absorptive material, such as paraffin, is positioned between the source 12 and the phosphor 14 to prevent neutrons from passing directly from the source 12 to the phosphor 14 without passing through the formations.

Figure 2:
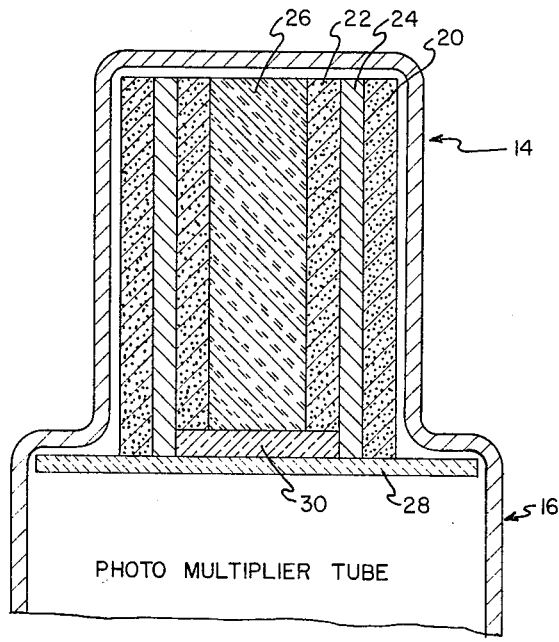
FIGURE 2 is a vertical section through the detector of the apparatus of FIGURE 1.

As best seen in FIG. 2, the compound phosphor 14 comprises a pair of substantially concentric cylinders 20 and 22 each of which is formed of a neutron sensitive material, such as lithium iodide enriched in lithium-6, which will emit light flashes in response to detection of neutrons. The cylinders 20 and 22 are preferably formed with relatively thin walls and are separated by a cylindrical shield 24 formed of a thermal neutron absorptive material, such as cadmium, which is also opaque to the light flashes produced by neutron detection in the phosphors 20 and 22. With this arrangement, thermal neutrons will be detected in the outer phosphor 20 but will be prevented from reaching the inner phosphor 22 due to the shield 24. On the other hand, due to their greater penetrating power, epithermal neutrons will generally pass through the outer phosphor 20 undetected and will pass through the shield 24 to be detected by the inner phosphor 22. Thus, outer phosphor 20 will detect only thermal neutrons while inner phosphor 22 will detect only epithermal neutrons. Preferably, a core 26 of neutron moderating material, such as Lucite, will be provided within the inner phosphor 22 to interact with neutrons which have penetrated through the inner phosphor 22 and, by elastic collisions with atoms of the moderator material, to reduce the energy of such neutrons and to increase the probability that such neturons will be detected when they emerge from the moderator and pass outwardly through the inner phosphor 22.

Figure 3:
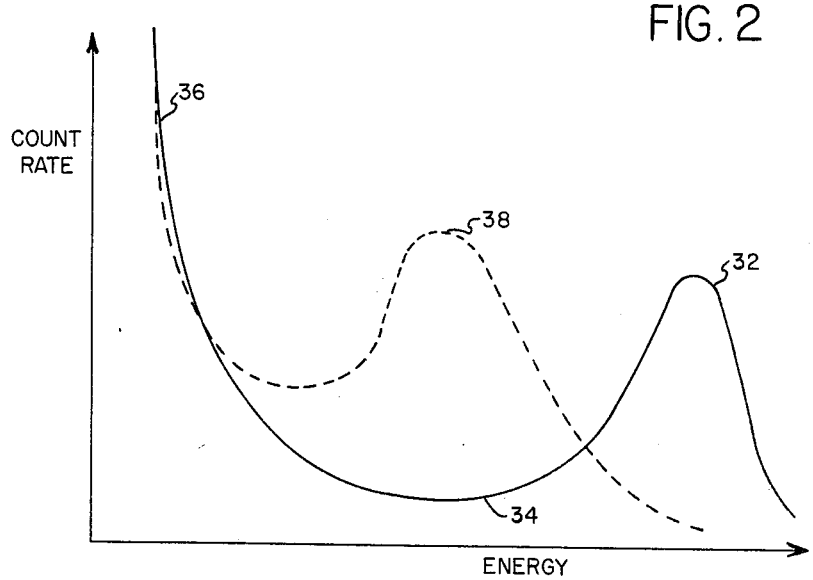
FIGURE 3 is a curve showing the spectral distribution of pulses from the detector of FIGURE 2.

As shown, both phosphors 20 and 22 are optically coupled to the photocathode 28 of the common photomultiplier tube 16. It is well known that most neutron-sensitive scintillation materials detect neutrons by means of the n, alpha reaction and that the intensity of the resulting scintillations is indicative of the energy of this reaction, rather than the energy of the incident neutrons. This energy is about 4.78 mev. in lithium iodide. It is also known that by forming the neutron scintillation phosphors relatively thin in the direction of travel of incident radiation, interference from simultaneous detection of gamma rays can be virtually eliminated. As a result, the photomultiplier output will show a fairly sharp peak at about the pulse height corresponding to the energy of the n, alpha reaction, as indicated at 32 on the solid curve of FIG. 3. Moreover, due to the monochromatic nature of the reaction, the photomultiplier output differential pulse spectrum will show a distinct valley, indicated at 34, between the peak 32 and the noise level, indicated at 36. In order to distinguish the signals of phosphor 20 from those of phosphor 22, light attenuation means are provided to reduce the intensity of the scintillations passing from one of the phosphors 20 or 22 to the photomultiplier tube 16 while the scintillations from the other phosphor are passed unattenuated to the photomultiplier tube 16. With this arrangement, the output of the photomultiplier tube 16 corresponding to neutron detection in the unattenuated phosphor will be substantially that of the solid curve of FIG. 3. However, the reduction of intensity of the scintillations from the attenuated phosphor will appear to the photomultiplier tube 16 as an apparent reduction in energy. This will cause the n, alpha peak of the attenuated phosphor to be shifted toward a lower apparent energy or to the left as seen in FIG. 3. This is indicated at 38 on the dotted curve of FIG. 3.

The light attenuation thus described may be accomplished in various manners. Thus, if desired, phosphor 20 might be europium-activated lithium iodide while phosphor 22 could be tin-activated. The latter has lower scintillation efficiency and may therefore require less attenuation, or none. As shown, phosphor 20 may be directly coupled to the photocathode 28 of photomultiplier tube 16 while a light attenuating disc 30 is interposed between phosphor 22 and photocathode 28. Obviously, the amount of the apparent energy shift provided by the light attenuation means will depend upon the opacity of the attenuator and may be varied substantially as desired. Preferably, however, the attenuation should be such that the two peaks 32 and 38 will be clearly separated in the photomultiplier output. For example, where the peak of the unattenuated phosphor is at 4.78 mev., the reduction in apparent energy provided by the light attenuator should be such that the peak from the attenuated phosphor will fall at about 2.4 mev. In this way, the output of photomultiplier tube 16 will have two peaks; one at about 4.78 mev. representing neutron detection by the unattenuated phosphor and a second at about 2.4 mev. representing neutron detection by the attenuated phosphor. It will be apparent that such attenuation may be applied to either of the phosphors 20 or 22, as desired.

Returning to FIG. 1, the signals from photomultiplier tube 16 are supplied to suitable signal processing circuits, indicated at 40 in FIG. 1. Various types of conventional signal processing circuits may be used and may include such elements as amplifiers, differential discriminators, blocking oscillators, and other conventional circuitry for selecting the desired detector pulses and for applying the signals to cable 4 for transmission to the surface of the earth. At the surface, the signals are supplied to a pulse height analyzer 42, or the like, which separates the singals of phosphor 20 from those of phosphor 22. The signals from phosphor 20 may be supplied to a first signal channel including a suitable counting rate meter 44 which may, if desired, contain additional amplifiers or other conventional signal processing circuits, and may thereafter be applied to a suitable recorder 46, which records the signals as functions of depth, to provide a thermal neutron log. Similarly, the signals from phosphor 22 may be supplied to a second signal channel including a suitable counting rate meter 48, similar to counting rate meter 44, and may then be applied to a suitable recorder 50, which records the signals as functions of depth, to provide an epithermal neutron log. It will be understood, of course, that the recorders 46 and 50 may, if desired, be separate galvanometers of a multiple trace recorder. It will also be apparent that the pulse height analyzer 42 could, if desired, be included in the subsurface instrument 2 and the respective signals could be transmitted to the surface independently over separate signal channels or by suitable multiplexing. The outputs of count rate meters 44 and 48 may also be indicated on a common recording strip, or may be processed by conventional computer equipment to obtain functions of the logging measurements.

Figure 4:
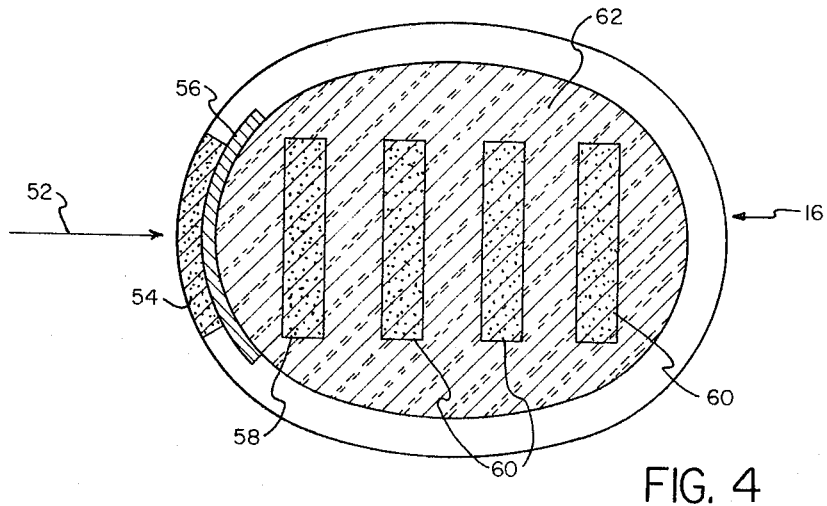
FIGURE 4 is a transverse section through an alternative form of the detector of FIGURE 2.

In many instances, it will be desirable to obtain the advantages of the present invention in a directionally sensitive logging instrument, such as one wherein one side of the instrument is urged against the borehole wall and heavy shielding is provided about the sides and back of the instrument so that radiation can reach the detector only from the side adjacent the borehole wall. Such an instrument is disclosed in the patent of Arthur H. Youmans, Patent No. 3,032,658, issued May 1, 1962. With such instruments, the form of the detector shown in FIGS. 4 and 5, may be employed.

Figure 5:
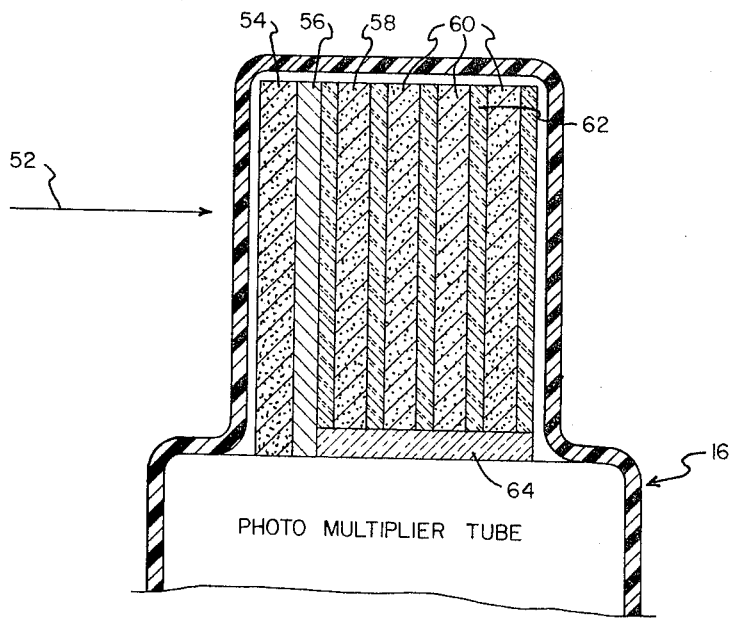
FIGURE 5 is a vertical section through the detector of FIGURE 4.

Since radiation can only reach the detector from one direction, it may be assumed that all neutrons are incident on the compound phosphor only from the direction indicated by arrow 52 and that the sides and back of the phosphor are protected by shielding. Obviously, in this instance, it is not necessary to employ cylindrical phosphors, as in the form shown in FIG. 2. Accordingly, the outer phosphor may be merely a plate or semicylindrical sheet, as shown at 54 in FIGS. 4 and 5. Moreover, the thermal neutron absorbing shield may be similarly shaped, as seen at 56. The inner phosphor may be in the form of a plate, as shown at 58. However, for greater efficiency in detecting epithermal neutrons, it is preferred to employ a plurality of plates, as seen at 60, which are identical to the plate 58 and are separated from plate 58 and from each other by a suitable material to absorb secondary electrons and serve as a neutron moderator, for example, Lucite, indicated at 62. The outer phosphor plate 54 and the inner phosphor plates 58 and 60 are optically coupled to photomultiplier tube 16, as shown in FIG. 5, and the light attenuation means, indicated by plate 64 may be interposed between either outer phosphor 54 and the photomultiplier tube 16 or between the inner phosphor plates 58 and 60 and the photomultiplier tube 16. In the alternative, as described with respect to FIG. 2, the light attenuation means may be provided by employing different types of phosphor or different activating materials.

With this form of the invention neutrons will be incident on the compound phosphor only from the direction of arrow 52, as discussed above. Accordingly, thermal neutrons will be detected by phosphor plate 54 and will be prevented from reaching the inner phosphor plates 58 and 60 by the shield 56. On the other hand, epithermal neutrons will penetrate through outer phosphor plate 54 and shield 56 and will be detected by phosphor plate 58. Any epithermal neutrons having sufficient energy to pass through inner phosphor plate 58 without being detected will be slowed by interactions with atoms of the moderator 62 and will be detected by one or another of the phosphor plates 60. The material of the phosphor plates 58 and 60 will preferably be identical and the light attenuation provided by attenuator 64 will be the same for all of the inner phosphor plates 58 and 60. Consequently, the output of the photomultiplier tube 16 will be the same for this form of the invention as was described above with respect to FIG. 2.

It is to be noted that, in any form, the present invention provides that both the thermal and epithermal logging measurements will be derived with the same source distance spacing, and from a common detection point in the borehole. The prior art generally employs single detectors for obtaining thermal and epithermal measurement, and thus cannot obtain both measurements from a common point in the borehole at the same time. Moreover, in order to provide equal distance to detector spacing in a small diameter logging tool, the detectors are generally located on opposite sides of the source; i.e., one detector is positioned above the source, while the other detector is positioned an equal distance below the source. Thus, the prior art apparatus essentially logs two different levels in the borehole, and such measurements must be correlated at the surface in order to show their functional relationship. The present invention, however, provides simultaneous thermal and epithermal measurements which need no such correlation, and which, therefore, eliminate much of the inaccuracies necessarily present with utilization of methods and apparatus in the prior art.

Obviously, numerous variations and modifications may be made without departing from the present invention. Accordingly, it should be clearly understood that the forms of the invention described above and shown in the figures of the accompanying drawings are illustrative only and are not intended to limit the scope of the invention.

What is claimed is:

1. A compound scintillation detector comprising a first radiation sensitive scintillation phosphor, a second radiation sensitive scintillation phosphor, a radiation absorbing shield separating said phosphors, said phosphors being so positioned that incident radiation must pass through said first phosphor and said shield to reach said second phosphor, a photomultiplier tube optically coupled to both of said phosphors, and means for attenuating light passing from one of said phosphors to said photomultiplier tube.

2. A compound scintillation detector comprising a first radiation sensitive scintillation phosphor, a second radiation sensitive scintillation phosphor, a radiation absorbing shield separating said phosphors, said phosphors being so positioned that incident radiation must pass through said first phosphor and said shield to reach said second phosphor, a photomultiplier tube optically coupled to both of said phosphors, and light attenuating means interposed between one of said phosphors and said photomultiplier tube to reduce the intensity of light passing from said one of said phosphors to said photomultiplier tube.

3. A compound scintillation detector comprising a first radiation sensitive scintillation cylinder, a second radiation sensitive scintillation cylinder mounted substantially concentrically with said first cylinder, a cylindrical shield positioned between said first and second cylinders to prevent at least one type of radiation from reaching said second cylinder, a photomultiplier tube optically coupled to both of said scintillation cylinders, and light attenuation means interposed between one of said scintillation cylinders and said photomultiplier tube to reduce the intensity of light flashes passing from said one of said cylinders to said photomultiplier tube.

4. A compound scintillation detector comprising a first radiation sensitive scintillation cylinder, a second radiation sensitive scintillation cylinder mounted substantially concentrically within said first cylinder, a cylindrical shield positioned between said first and second cylinders to prevent at least one type of radiation from reaching said second cylinder, a photomultiplier tube optically coupled to both of said scintillation cylinders, and light attenuation means interposed between one of said scintillation cylinders and said photomultiplier tube to reduce the intensity of light flashes passing from said one of said cylinders to said photomultiplier tube.

5. A compound scintillation detector comprising a first radiation sensitive scintillation cylinder, a second radiation sensitive scintillation cylinder mounted substantially concentrically within said first cylinder, a cylindrical shield positioned between said first and second cylinders and serving to prevent radiation of the type detected by said first cylinder from reaching said second cylinder, a photomultiplier tube optically coupled to both of said scintillation cylinders, and light attenuation means interposed between one of said scintillation cylinders and said photomultiplier tube to reduce the intensity of light flashes passing from said one of said cylinders to said photomultiplier tube.

6. A compound scintillation detector comprising a first scintillation cylinder responsive to thermal neutrons, a second scintillation cylinder responsive to epithermal neutrons, said second cylinder being mounted substantially concentrically within said first cylinder, a cylindrical shield positioned between said first and second cylinders and serving to prevent thermal neutrons from reaching said second cylinder, a photomultiplier tube optically coupled to both of said scintillation cylinders, and light attenuation means interposed between one of said scintillation cylinders and said photomultiplier tube to reduce the intensity of light flashes passing from said one of said cylinders to said photomultiplier tube.

7. A compound scintillation detector comprising a first scintillation cylinder formed of lithium iodide, a second scintillation cylinder formed of lithium iodide and mounted substantially concentrically within said first cylinder, a cylindrical shield formed of cadmium and positioned between said first and second cylinders to prevent thermal neutrons from reaching said second cylinder, a photomultiplier tube optically coupled to both of said scintillation cylinders, and light attenuation means interposed between one of said scintillation cylinders and said photomultiplier tube to reduce the intensity of light flashes passing from said one of said cylinders to said photomultiplier tube.

8. Apparatus for radioactivity well logging including a subsurface instrument; surface equipment; and a cable; said cable serving to traverse said subsurface instrument through a borehole and providing electrical connections between said subsurface instrument and said surface equipment; said subsurface instrument comprising a source of high energy neutrons, a compond scintillation detector, shielding means interposed between said source and said detector to prevent neutrons from passing directly from said source of said detector, and signal processing means for receiving signals from said detector and applying said signal to said cable for transmission to said surface equipment; said detector comprising a first scintillation cylinder responsive to thermal neutrons, a second scintillation cylinder responsive to epithermal neutrons, said second cylinder being mounted substantially concentrically within said first cylinder, a cylindrical shield positioned between said first and second cylinders and serving to prevent thermal neutrons from reaching said second cylinder, a photomultiplier tube optically coupled to both of said scintillation cylinders and serving to convert light flashes from said scintillation cylinders into electrical signals, and light attenuation means interposed between one of said scintillation cylinders and said photomultiplier tube to reduce the intensity of light flashes passing from said one of said cylinders to said photomultiplier tube; said surface equipment comprising means for receiving signals from said subsurface instrument and for separating said signals into a first signal channel corresponding to signals from said first cylinder and a second signal channel corresponding to signals from said second cylinder; and means for independently recording the signals of said first and second signal channels as functions of depth.

9. A compound scintillation detector comprising a first phosphor adapted to develop scintillations in response to incident radiations, a second phosphor adapted to develop scintillations in response to incident radiations, said second phosphor being differently activated with respect to said first phosphor and containing a light attenuation substance, a radiation absorbing shield interposed between said first and second phosphors, and a photomultiplier tube optically connected to both of said phosphors.

References Cited by the Examiner
UNITED STATES PATENTS 2,755,390   7/1956   Teichmann _____ 250—71.5
3,032,658   5/1962   Youmans _____ 250—71.5

RALPH G. NILSON, *Primary Examiner.*

JAMES W. LAWRENCE, *Examiner.*

ARCHIE R. BORCHELT, *Assistant Examiner.*